C. F. McBEE.
BOOKBINDING MACHINE.
APPLICATION FILED FEB. 13, 1917. RENEWED AUG. 19, 1919.

1,333,123. Patented Mar. 9, 1920.
10 SHEETS—SHEET 5.

Inventor
Charles F. Mc Bee
By Jell G. Roe
Attorney

Witnesses
W. F. Doyle
L. R. Fiedler

C. F. McBEE.
BOOKBINDING MACHINE.
APPLICATION FILED FEB. 13, 1917. RENEWED AUG. 19, 1919.

1,333,123. Patented Mar. 9, 1920.
10 SHEETS—SHEET 6.

Inventor
Charles F. McBee

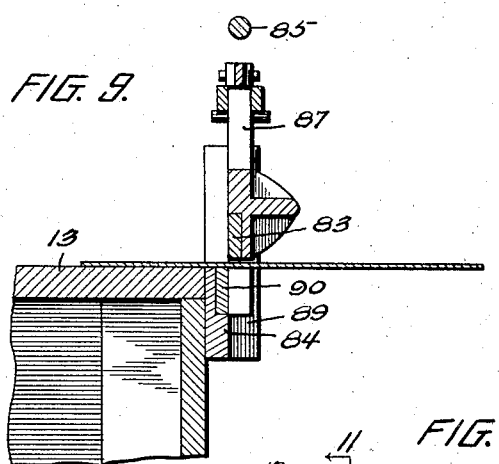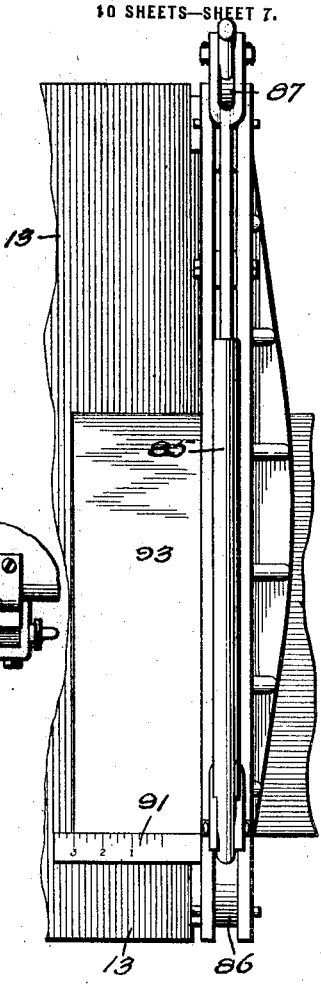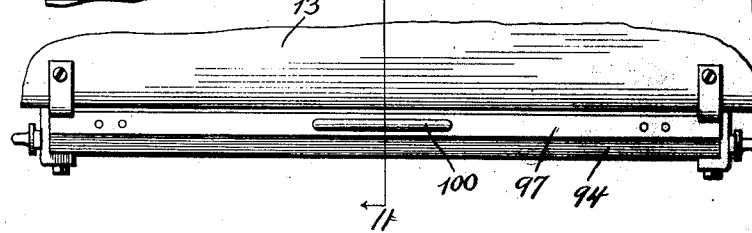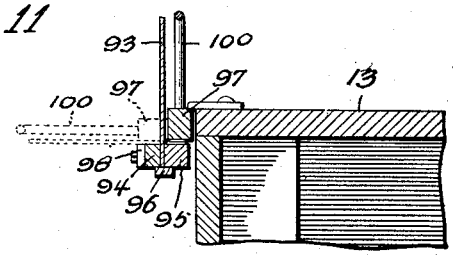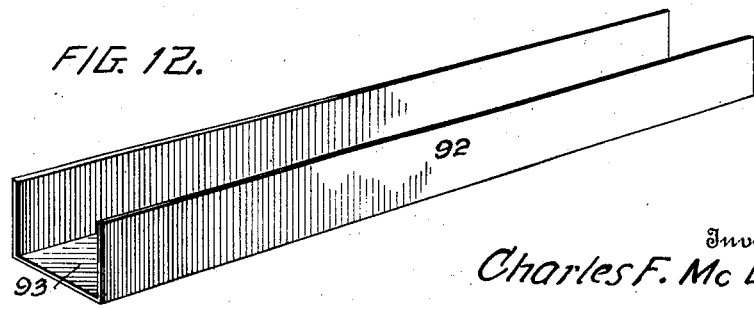

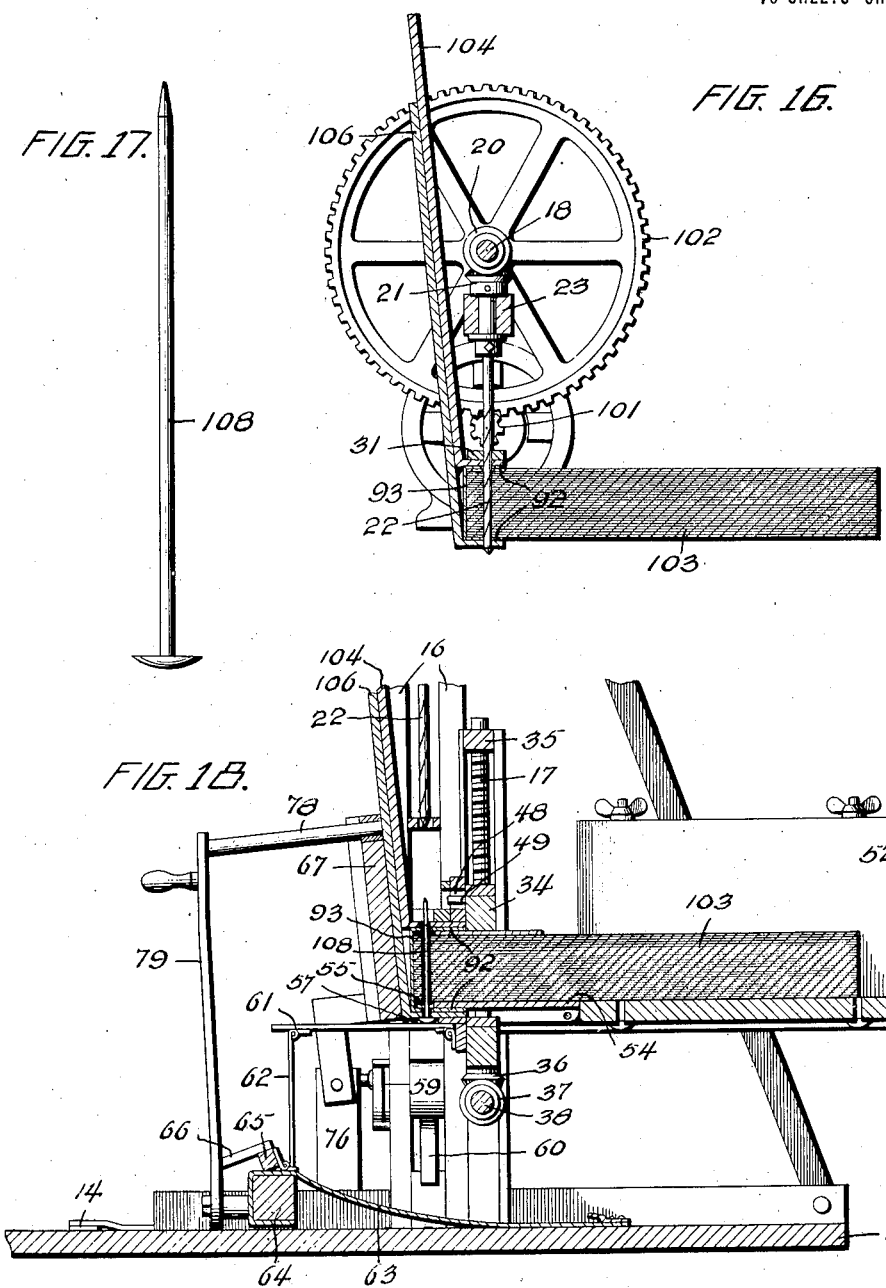

C. F. McBEE.
BOOKBINDING MACHINE.
APPLICATION FILED FEB. 13, 1917. RENEWED AUG. 19, 1919.
1,333,123.
Patented Mar. 9, 1920.
10 SHEETS—SHEET 10.
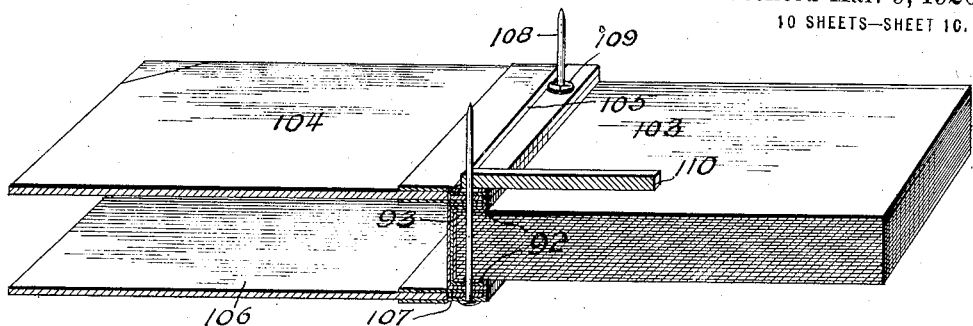
FIG. 19.
FIG. 20.     FIG. 21.
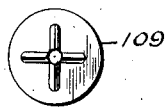 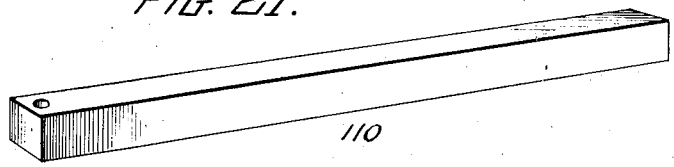
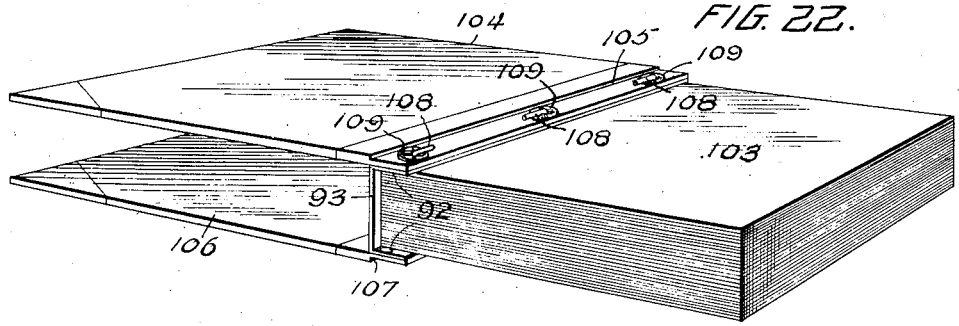
FIG. 22.
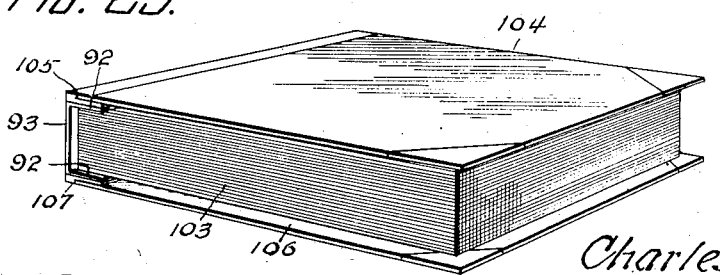
FIG. 23.
Inventor
Charles F. McBee
By
Attorney

UNITED STATES PATENT OFFICE.

CHARLES F. McBEE, OF ATHENS, OHIO.

BOOKBINDING-MACHINE.

1,333,123.  Specification of Letters Patent.  Patented Mar. 9, 1920.

Application filed February 13, 1917, Serial No. 148,304. Renewed August 19, 1919. Serial No. 318,592.

*To all whom it may concern:*

Be it known that I, CHARLES F. MCBEE, a citizen of the United States, residing in Athens, county of Athens, and State of Ohio, have invented a new and useful Improvement in Bookbinding - Machines, of which the following is a specification.

The object of my invention is to produce, in a simple and convenient construction, a binding machine by which may be accomplished all necessary details of the work, and capable of being easily moved or shifted from one place to another so that an establishment having a large amount of binding may avail itself of the opportunity of maintaining its own plant in its place of business. There is a large demand for such a machine, for several reasons, chief among which is that large responsible offices charged with a legal responsibility for their records do not favor intrusting them to the various firms which do a binding business, for, in addition to the occasional loss which oftentimes occurs, the absence of such records from the office causes considerable embarrassment and extra work.

My device not only makes it possible to have all this work performed in the office of the user, but in addition assures a uniformity of binding for filing purposes, and also saves a large amount of money.

Some machines for this purpose have been devised which will do a part of the work, such, for instance, as the boring or the binding together of the parts, but such machines are not constructed with the single end in view of turning out a complete book. Heretofore it has been impossible to secure uniformity through a large variety without constant changes and adjustment, while in my machine the parts are so correlated and coördinated that one adjustment will suffice for practically all sized volumes to be produced. My purpose is to produce a complete machine which will take the back material, cut and form it into proper shape to receive the particular volume being bound, receive, even, compress and perforate, the leaves to be bound, and then hold them in proper position while the back and covers are being fitted and secured thereto.

My invention consists of certain details of construction hereinafter set forth, pointed out in my claims and illustrated in the accompanying drawings in which Figure 1 shows a perspective view of my completed machine:

Fig. 8 shows a plan view, in detail, of the cutting device which forms a part of my device:

Fig. 9 shows a detail view, in section, of the same:

Fig. 10 shows a detail view, in elevation, of the crimping device which forms a part of my device:

Fig. 11 is a transverse section, on line 11—11 of Fig. 10 of the same:

Fig. 12 shows a perspective view of one of the backs shaped by my machine:

Fig. 16 shows an enlarged detail, of the drills after they have passed through the volume to be bound, the volume and a part of the machine being in section, the motor pinion and drill driving gear wheel being stripped of their housings:

Fig. 17 shows a detail of one of the securing bolts I employ:

Fig. 18 shows a sectional view of a part of the machine and a volume therein, after the drilling process has taken place, the securing bolts being in place and the supporting members therefor in operating position:

Fig. 19 shows a perspective view, in section, of a volume which has been assembled and drilled and the securing bolts placed in position and locked, with the wrench on one of the bolts to turn and secure same:

Fig. 20 shows a view of one of the clamping disks I employ to secure the bolts:

Fig. 21 shows the wrench I employ to turn the ends of the securing bolts:

Fig. 22 shows a completed volume, in perspective, the covers being turned back:

Fig. 23 shows a perspective view of the same, the volume being closed:

Figure 1:
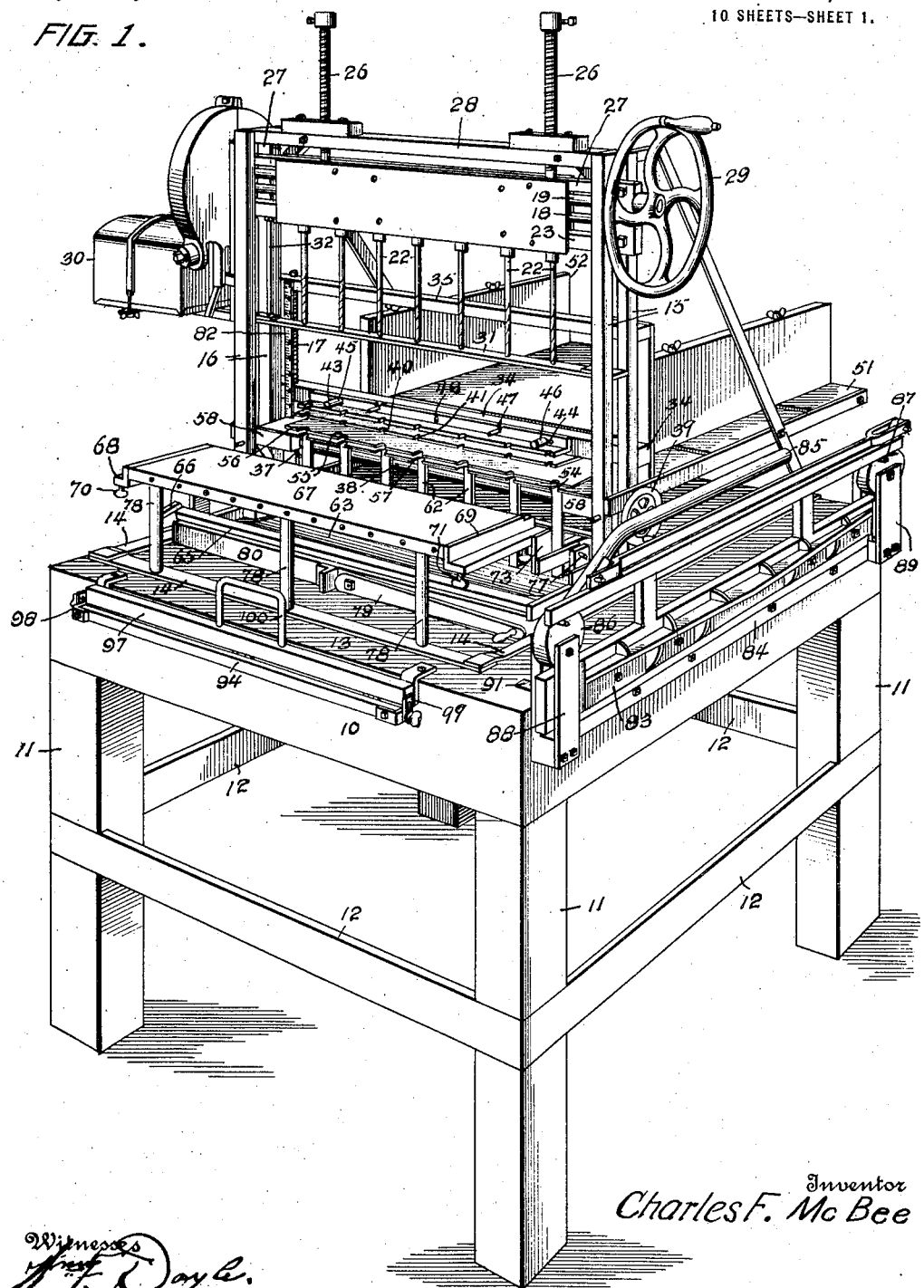

Referring to the accompanying drawings, the reference numeral 10 is used to indicate, generally, the supporting base of my machine, supported, at about table height, by legs 11, braced, as shown, by cross bars 12, and provided with a top 13. On this table are mounted all the operating parts of my machine which is adapted to receive, even, compress and perforate, the leaves to be bound, and to retain them in proper position while the back for the volume is being cut and shaped, and the covers and back are being fitted and secured thereto.

The frame of the machine is provided with base strips 14, preferably of metal, from which protrude upwardly, in a vertical plane standards 15—15 and 16—16, said standards being parallel, and spaced in pairs on either side of the machine as shown. In the space between the parallel standards is mounted a drilling device, designed to travel vertically therein, said drilling device being constructed of parallel shafts 18 and 19, horizontally mounted, the shaft 18 having a plurality of beveled pinions 20, evenly spaced and arranged and designed to mesh with and operate pinions 21, secured to, and designed to operate, bits, or drills, 22, rotatably secured in a cross bar 23, and depending therefrom. The shaft 19 is provided with bevel pinions 24, designed to mesh with, and operate, pinions 25 secured to screw shafts 26, rotatably mounted in cross bars 27 and 28, and extending upwardly therethrough. The shaft 19 is rotatably mounted in its bearings and one end protrudes through its supporting upright, and has secured thereto a hand wheel 29, by means of which said shaft is rotated. The shaft 18 is also rotatably mounted in its bearings and one end thereof protrudes through its supporting upright to a gear connected with a motor 30, by means of which it is rotated.

Figure 2:
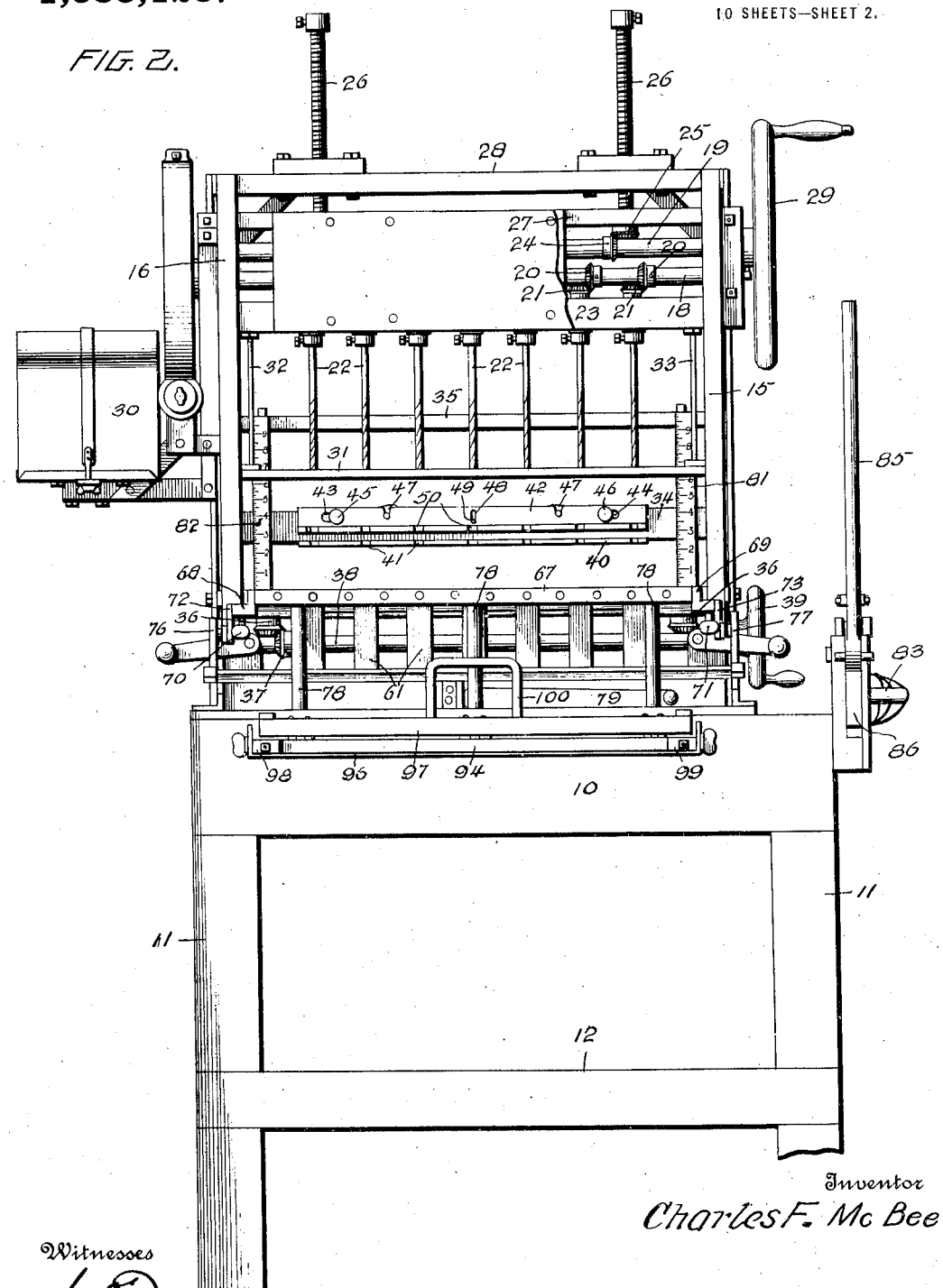
Fig. 2 shows a front elevation view of the same, a part of one leg being broken away.
Figure 3:
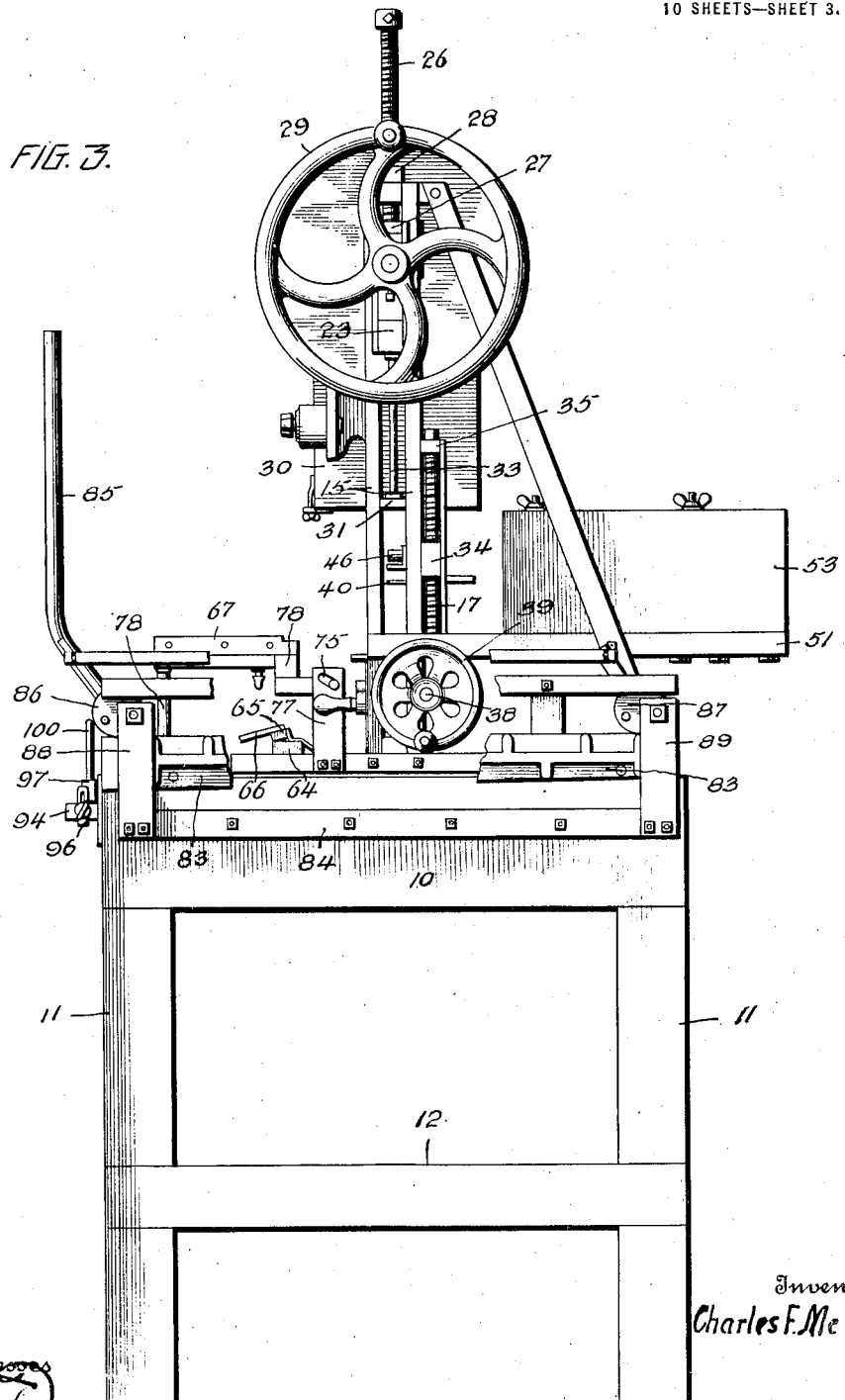
Fig. 3 shows a side elevation view of the same, a part of the cutting device being broken away.
Figure 4:
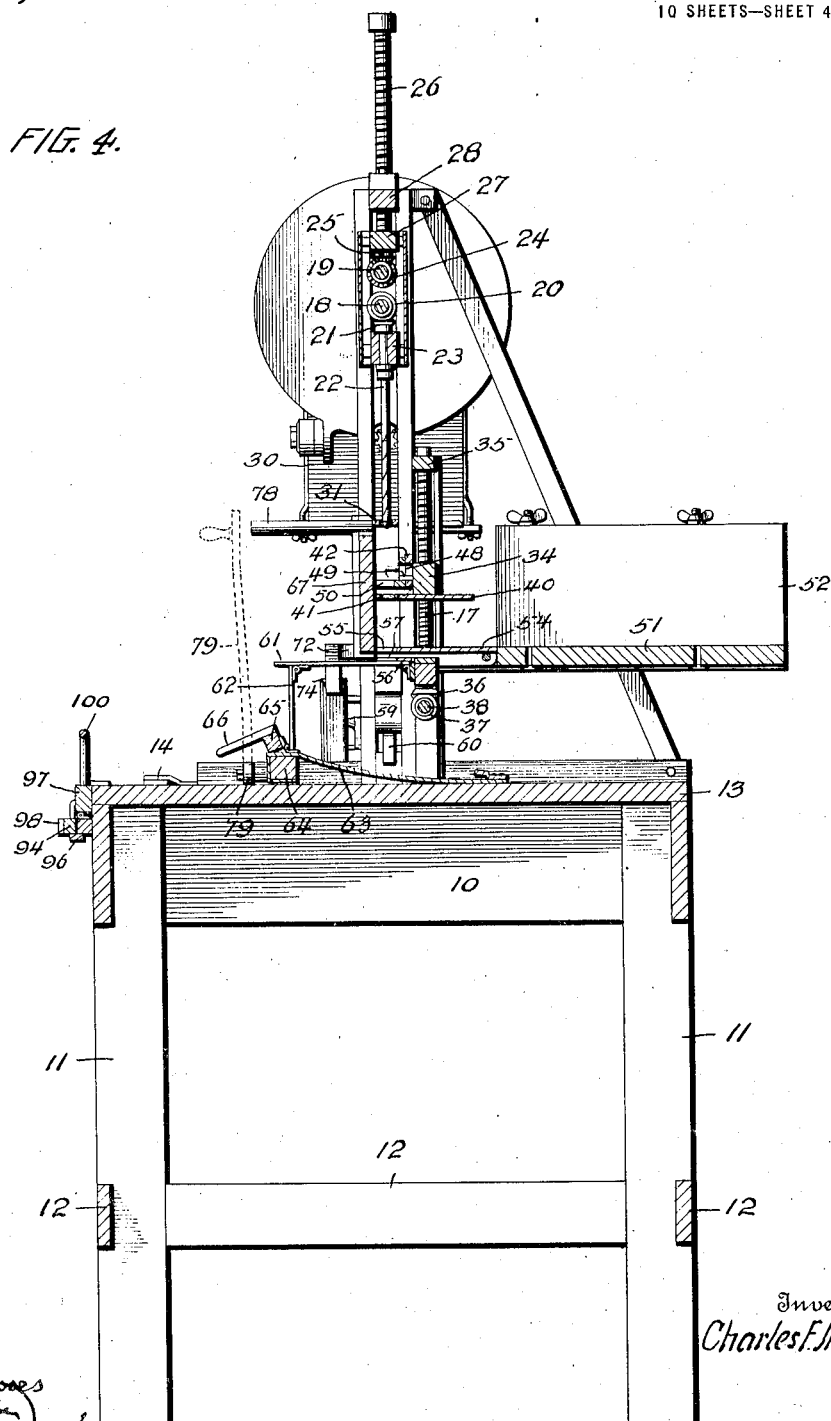
Fig. 4 shows a vertical sectional view of my device, the dotted lines indicating one position of the evener board supporting lever.

The numeral 31 indicates a guide bar, preferably of metal, suspended, by means of rods 32 and 33 from the drill carriage above described, and movable therewith to a limited distance downwardly, or until it rests upon the guide plates secured to the pressure bar, hereinafter described. The rods 32 and 33, carrying the said guide bar 31, are loosely secured within the lower cross bar of the drill carriage and also loosely secured to the guide bar 31, so that when the guide bar 31, during the downward movement of the drill carriage, contacts with the upper guide plate secured on the pressure bar, the guide bar 31 will remain stationary, and rest upon the said guide plate, while the rods 32 and 33 will continue to move downwardly, with the drill carriage through the said guide bar, or in the event of the said rods 32 and 33 contact the base board of the machine, they will remain stationary in said position while the drill carriage continues to move downwardly. It is obvious that in elevating the drill carriage the guide bar 31 will be picked up by the rods 32 and 33, and carried back to normal position shown in Figs. 1 and 2. The guide bar 31 is perforated to permit the passage of the drills 22 therethrough, and the normal position of the guide bar 31 is, as shown in Figs. 1, 2 and 4, at the lower extremity of the drills, with the points of the drills protruding slightly into orifices, or perforations, provided therefor and through which they are designed to pass. This bar is designed as a guide for the drills.

Figure 26:
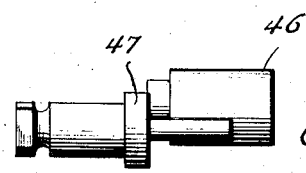
Fig. 26 shows a perspective view of one of the said levers, same having been removed from its mounting.

The numeral 34 indicates the pressure bar I employ for compressing, and retaining in position, the leaves to be bound. Obviously the pressure bar extends transversely across the machine in a position parallel to the base, and is slidably secured, for vertical movement, immediately to the rear of the standards 15—15 and 16—16. Screw threaded shafts 17, rotatably secured in the machine below the pressure bar, engage, and pass through, screw threaded openings in a cross bar 35 which is a part of the pressure bar 34. As stated, the screw threaded shafts are journaled in the base of the machine, and protrude therethrough, and on the lower end of each of them is secured a pinion 36, designed to mesh with its companion pinions 37, secured to a shaft 38 mounted for rotary movement, in the standards of the machine, and parallel with and below, the base thereof, one end of the shaft 38 extending through one side of the machine and having secured thereto a hand wheel 39. The construction is such that the rotation of the hand wheel 39 operates, simultaneously, the pinions 36 which obviously rotate their respective shafts, 17, and thus the pressure bar 34 is lowered, or elevated, always remaining parallel to the base. To the under surface of the pressure bar 34 I have secured a guide plate 40, preferably constructed of metal, provided with a series of spaced recesses 41, in its forward surface, designed to receive their respective drills 22. On the forward face of the pressure bar 34 I have secured a second guide plate 42, preferably constructed of metal, being L shaped in cross section, said guide plate being slotted longitudinally, at 43 and 44, said slots being designed to receive stub shafts 45 and 46 respectively, said stub shafts being similar in every respect, and offset, as clearly shown in Fig. 26, the offset portion of said stub shafts being mounted for rotation in pressure bar 34. These offset stub shafts are rotated by means of levers or arms 47. The guide plate 42 is provided with a vertical slot 48, in its central portion, and a pin, or guide member, 49, secured in pressure bar 34, protrudes through the said slot. The guide plate is also provided with recesses 50 in its forward surface, designed to register with the recesses 41 in the guide plate 40.

Figure 6:
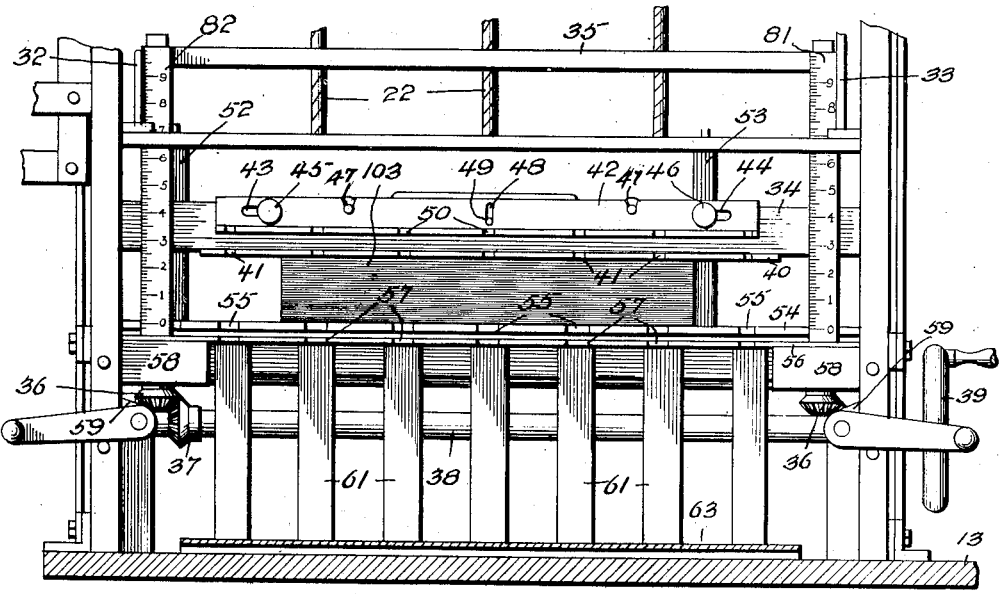
Fig. 6 shows a front elevation view of a part of my device, partially in section, with a number of leaves held under compression therein.
Figure 7:
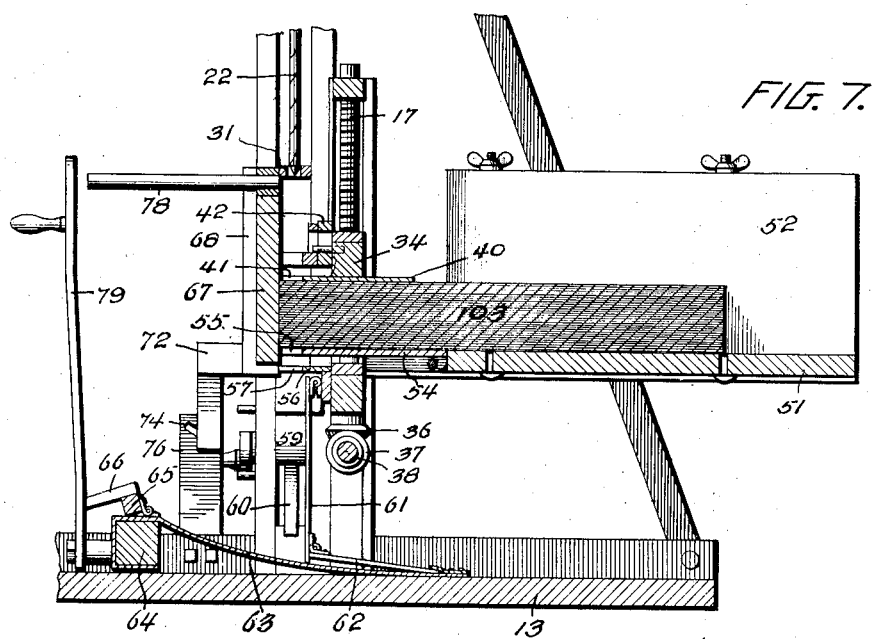
Fig. 7 shows a transverse sectional view of the same.

The guide plate 42 is so constructed, and mounted, that the operation of levers 47 will cause the guide plate 42 to move downwardly, in a vertical plane, and, obviously, the recesses 50 are in line with their respective recesses 41, in the guide plate 40. The normal position of the guide plate 42 is as shown in Figs. 1 and 6, and the raising of the levers 47 causes it to move downwardly, for purposes hereinafter set forth.

Figure 5:
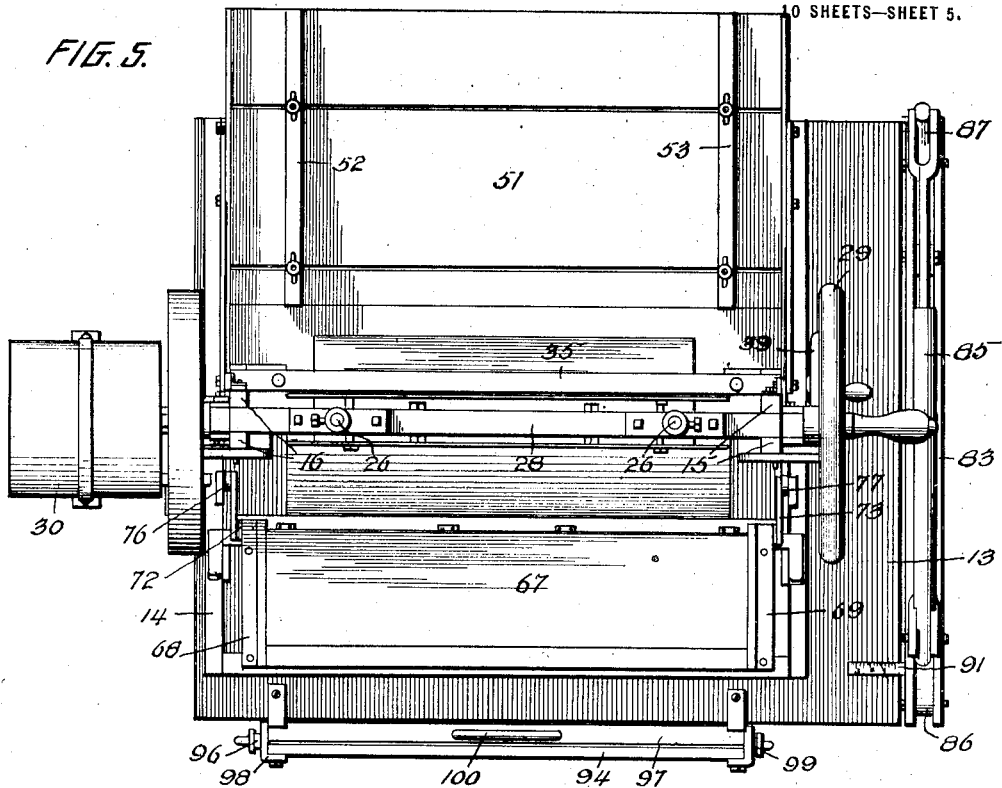
Fig. 5 shows a plan view of my device.
Figure 24:
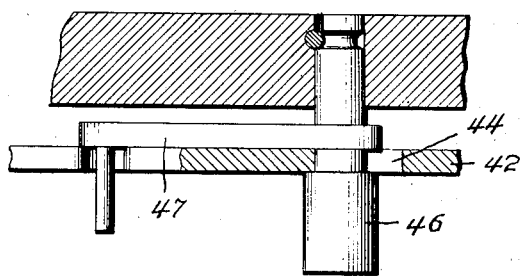
Fig. 24 shows a detail view, in section, of one of the clamping members which I employ for holding the upper cover and back in proper position prior to the drilling and securing.
Figure 25:
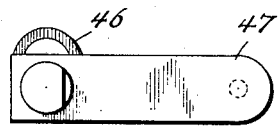
Fig. 25 shows a detail view, in rear elevation, of the said clamping levers.

The numeral 51 indicates the base or table of my machine, on which the leaves to be bound are placed, and the numerals 52 and 53 indicate evener sides, secured thereto in such a manner as to be adapted for adjustment longitudinally of the machine, as clearly shown in Fig. 5. Countersunk in the forward upper surface of the base is a guide plate 54, preferably constructed of metal, which protrudes forwardly from the base to a point in line with the guide plates 40 and 42, and the said plate 54 is provided, in its forward surface, with a series of recesses 55 in line with the recesses 41 and 50, and designed to register therewith. The numeral 56 indicates a guide plate, preferably constructed of metal, secured to the forward part of the machine and extending transversely across same, mounted immediately below, but slightly spaced from, the guide plate 54, and the said plate 56 is also provided with a series of recesses 57, in its forward surface, so arranged as to register with the recesses 55 in the plate 54. The plate 56 is provided on each of its ends with a downwardly projecting lug 58, designed to be engaged by cams 59, the rotation of which is designed to force the plate 56 upwardly to contact with plate 54. The bell crank levers are engaged by leaf springs 60, secured to their respective sides of the machine, by means of which desirable pressure is retained upon the bell crank levers, thereby holding them in any desired position.

Figure 13:
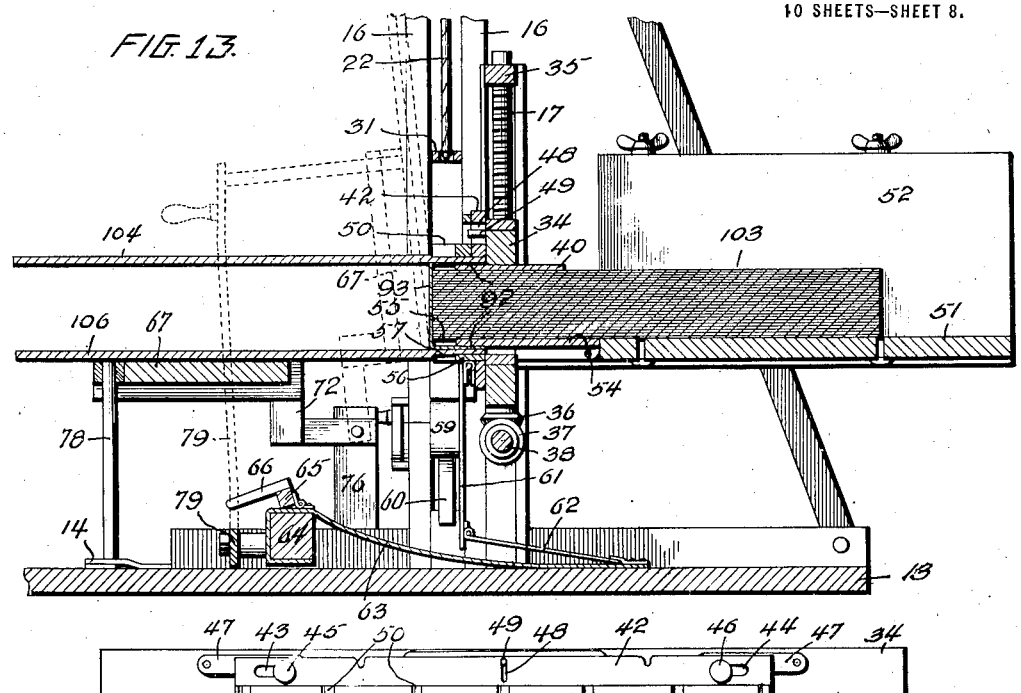
Fig. 13 shows a sectional view of the main part of my machine, with a volume to be bound therein, the covers and back being in place thereon, the dotted lines indicating the position of certain parts when the drilling is taking place.
Figure 14:
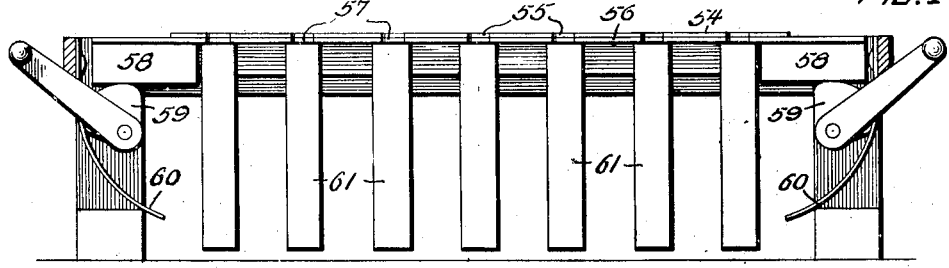
Fig. 14 shows a detail view, partially in section, of a part of my machine, illustrating the supporting members I employ for holding the securing bolts, or nails, in position after their insertion and before they have been secured.
Figure 15:
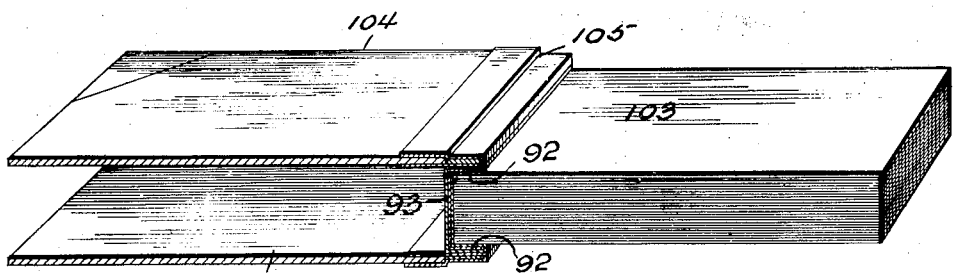
Fig. 15 shows a perspective view, in section, of a volume; as it would appear assembled, but not prepared for binding.

The numerals 61 indicate supporting members which are hinged to the forward part of the machine, one of said members being in line with each of the recesses 57 in the guide plate 56. These members are designed, when used as will be hereinafter described, to extend forwardly in a horizontal plane, their upper surfaces engaging the lower surface of the guide plate 56, and they are supported in this position by legs 62, hinged to their under surfaces, as clearly shown in Fig. 18. The numeral 63 indicates a curved pan secured to the top of the table 10, beneath the machine mechanism, extending practically the full width thereof, and extending forwardly between the standards of the machine, and curving upwardly to a connection with a cross bar 64, also mounted to the top of the table 10. This pan is designed as a guide, or supporting means, for the legs 62. The construction and mounting of the supporting members 61, the legs 62, the pan 63 and the cross bar 64, is such that when the members 61 are elevated, to the position shown in Fig. 18, the legs 62 will be of sufficient length to rest upon the cross bar 64, so as to maintain the members 61 horizontal. Upon pushing the legs 62 rearwardly from their hinged joint to the members 61, they will contact the inclined curving pan 63, on which they cannot support the members 61; and said members of their own weight will fall to the vertical positions shown in Figs. 13 and 14. These members 61, as just described, operate independently of each other, but I have provided a common releasing means, consisting of a bar 65, pivotally mounted on top of the cross bar 64, and designed to be operated by the hand lever 66, the bar 65 being so mounted that when the lever 66 is raised the bar will simultaneously engage, and push rearwardly, all of the legs 62, just releasing them from their support on the base 64, and causing all the members 61 to resume their normal positions shown in Fig. 14. The function of these members will be hereinafter described.

The numeral 67 indicates the forward evener board which I employ, being of sufficient length to fit between the standards of the machine when it is placed in its upright position, and on each side of said evener board I have provided an L shaped (in cross section) member, 68 and 69, so constructed and mounted that they will engage the forward faces of their respective standards, thereby fixing the position of the evener board with relation to the standards, when the evener board is in its upright position. In the members 68 and 69 I have secured set screws 70 and 71, the same being designed to extend through their respective members, when desired, for adjustment purposes, so that the evener board may thereby be adjusted to the desired spacing from the main part of the machine, the said screws engaging the forward faces of their respective standards, when they are used as a means of adjustment to maintain the evener board at a slightly greater distance from the table extension or guide plate 54. The evener board is provided at each of its inner, or lower, ends, with offset lug members, 72 and 73 respectively, each of which is provided with an outwardly projecting ear designed to be received by the inclined slots 74 and 75 respectively, formed in the short standards 76 and 77, respectively, secured to the top of the table, in advance of, and in close proximity to, their respective standards of the machine. The numeral 78 indicates supporting legs secured to the outer surface of the evener board, as shown, which legs, when the evener board is not in operation to even the leaves to be bound, support the board to operate as a table, or supporting member, for purposes hereinafter set forth, in the plane of the base 51 of the machine. This evener board is used for the dual purpose of evening the forward edges of the sheets to be bound, and as a retaining means to hold the covers in an upright position during the drilling process, as is shown in Fig. 18 and also by the dotted lines in Fig. 13. To retain the evener board in the positions shown in these figures, I have provided a latch bar 79 which is pivotally secured to a mounting 80, and is designed to be rotated upwardly, so as to contact the central leg 78, thereby retaining the evener board in a slightly inclined, but otherwise upright, position shown in Fig. 18.

On each side of my machine, close to their respective standards, and immediately in advance of the pressure bar 34, I have provided ruled scale bars, 81 and 82 respectively, the scale markings thereon increasing upwardly, starting from the upper surface of the base 51, as clearly shown in Fig. 6.

The greatest inconvenience which has been experienced by the large offices that have installed binding machines to do their work has been that, in order to meet with any success whatsoever, they have been compelled to purchase a large number of varying sized metal backs, shaped to receive certain thicknesses of sheets and covers, so as to make volumes of given sizes. In other words it has always been necessary to purchase these backs already shaped, and then to build the volume in the machine, of the exact size which would be necessary to fit the back already provided. This has been very unsatisfactory and therefore, in my improved binding machine, I have provided means whereby the size of the volume may be determined by the operator, and the backs cut and bent to fit the volume. This means consists of a metal cutting device which I have secured to one side of the machine, the knife 83 operating in a stationary bracket 84, secured to the side of the machine, the upward and downward movement of the knife being caused by the operation of a lever 85. The knife is mounted, as shown in Fig. 1, slidably on the cams 86 and 87, which are rotatably secured in their respective mountings 88 and 89, the upward movement of the lever rasing the knife above the table, and the downward pressure of the lever forcing the knife downwardly, contacting, in its downward movement, the outer edge of the stationary companion knife 90, which is secured to the stationary rack 84. A scale bar 91 is secured to the top of the table, and extends at right angles to, and inwardly from, a point in line with the edge of the cutting knife 83, but the scale on the said bar is so scored as to start from a given distance inwardly, the given distance being double the width desired for the flange 92, to be provided for the metal back 93 which is being formed. The operation of this device and its object, in conjoint relation to the machine in the binding of the volume, will be hereinafter described.

At one edge of the table, in the drawing shown as the forward edge, I have secured a crimping, or metal folding device, designed for shaping the metal into a back 93, to fit the volume being built in the machine. This device consists of a pair of parallel bars, 94 and 95, secured in a horizontal plane and spaced to receive between them the thickness of the metal to be used in forming the back. A metal strip, 96, Fig. 11, is secured to the under surface of said parallel bars to close the opening between them, so that the metal placed therein can only extend downwardly between the strips for a given distance, and the vertical thickness of the bars 94 and 95 is one half as great as the space left between the outer end of the scale bar 91 and the place on the bar where the scale starts. A third bar 97 is secured, for pivotal movement, to the ends of the bars 94 and 95, by means of lugs 98 and 99, (see Figs. 1 and 11) the normal position of the bar 97 being immediately above, in line with, and slightly spaced from, the bar 95, so that the forward faces of the bar 95 and the bar 97 are in the same plane, the two bars, obviously, being parallel. Mounted, centrally, in the upper surface of the bar 97, I have provided a handle 100, designed to be used in forcing the bar 97 downwardly, into the position shown by the dotted lines in Fig. 11.

In practical operation, the pressure bar 34 is elevated and the evener sides 52 and 53 secured in the position desired. The evener board 67 is then elevated, and permitted to slide downwardly in slots 74 and 75 until the members 68 and 69, or their set screw, as the case may be, engage the forward surfaces of the standards 16 and 15 respectively. This causes the evener board 67 to be positioned at exact right angles to the base 51 and the standards of the machine, and it is retained in such position by its own weight. The leaves to be bound are then placed in the machine, being evened against the evener board 67, and longitudinally evened against one of the sides 52 or 53. The pressure bar is then moved downwardly, by the rotation of the wheel 39, and when it contacts the upper surface of the papers to be bound, pressure is applied to the papers for tightly and firmly holding them in position. The evener board 67 is then raised, within the slots 74 and 75, obviously moving outwardly as well as upwardly, and then it is lowered to the position shown in Fig. 1.

The lower surface of the pressure bar 34 indicates the thickness of the papers under compression, on the scale bar 81 and 82. This indication is observed by the operator who then takes the sheet of metal, designed to be formed into a back, and, raising the knife 83 extends the sheet of metal thereunder, and in contact with the scale bar 91, until it reaches that point on the scale bar 91 which indicates the same measurement as the under line of the pressure bar 34 indicates on the scale bars 81 and 82. Obviously, the strip of metal is rectangular and is at right angles to, and flush against, the scale bar 91 which is secured at right angles to the cutting knife. The cutting knife is then forced downwardly cutting off a piece of metal which is designed to form the back 93. The distance between the cutting knife 83 and the zero of scale 91, is, as before stated, twice the distance that is desired for the width of the flanges 92, which are to be formed on the back 93.

The strip of metal is then placed within the crimping device, one of its longitudinal edges being projected downwardly between the bars 94 and 95 until it rests, evenly, upon the strip 96. The thickness of the bars 94 and 95, as hereinbefore described, is the same as the desired width of the flange 92. The handle 100 is then grasped and the bar 97 forced downwardly, on its pivotal mountings, until it rests immediately above the bar 94, and parallel thereto, forcing that part of the metal strip extending above the slot formed between the bars 94 and 95, outwardly, to a right angular position with that part of the said strip which is held between the said bars 94 and 95, as is clearly illustrated by the dotted lines in Fig. 11. The bar 97 is then elevated to the position shown in Fig. 11, and the metal strip taken out of the crimping device and reversed, the other longitudinal end of the metal being placed within the crimping device and the operation repeated, with the result that a metal back with right angular flanges of a given width is formed, as is shown in Fig. 12.

The back thus shaped is fitted over the forward end of the papers to be bound, the upper flange 92 passing between the plate 40 and the plate 42, and the lower flange 92 passing between the plate 54 and the plate 56. The upper cover, 104, hinged as shown at 105, (the smaller portion of the cover formed on one side of the hinge being in width equal to the width of the flange 92) is then placed on top of the flange 92, and between said flange and the plate 42. The arms 47 are then rotated, upwardly and outwardly, forcing the plate 42 firmly against the binding or hinged portion of the cover 104, thus clamping the cover 104 and the upper flange 92 of the back, firmly between the plates 40 and 42. In fitting the back to the volume to be bound, the lower flange 92 is inserted between the plates 54 and 56, together with a lower cover 106, hinged at 107, in an exactly similar manner to the cover 104. The cam lever 59 then being rotated upwardly, firmly clamps the lower flange 92 and the cover 106 between the plates 54 and 56. Obviously, in fitting the covers and backs they have been lined with relation to each other, so as to perfect the uniformity in the volume to be produced. The evener board 67 is then again elevated, forcing upwardly the extended covers 104 and 106 (which have been resting upon the evener board in its horizontal position) the covers breaking at their hinges, and the latch 79 being rotated upwardly until it contacts one of the central legs 78 (as clearly shown in Fig. 18) thereby retaining the evener board in this slightly inclined upright position, the covers 104 and 106 also extending upwardly on a slightly inclined plane.

The drill carriage is then lowered, by the rotation of the wheel 29, which operates, through the pinions 24 and 25, the screw threaded shafts 26. As the drill carriage descends it is obvious that guide bar 31 also descends, until it rests upon the guide plate 42, the drill carriage continuing to descend and the drills 22 extending through their respective orifices in the guide bar 31, and through their respective recesses 50, in the guide plate 42, until they contact the upper surface of the upper cover 104. The motor is then turned on, causing the rotation of the pinion 101 which, meshing with the gear wheel 102, rotates the shaft 18, carrying the pinions 20, which in turn mesh with, and rotate, the pinions 21, secured to the upper end of the drills 22, and thus the rotation of the drills is accomplished. As the drills 22 are rotated, pressure is applied by the rotation of the wheel 29, forcing the rotating drills through the upper cover 104, the upper flange 92, through their respective recesses 41 in the guide plate 40, through the papers 103, (to be bound) through the recesses 55 in the plate 54, through the lower flange 92, through the lower cover 106, and through the recesses 57 in the plate 56. The drill carriage is then elevated, withdrawing the drills from the perforations thus formed, until the drills are raised above the work and out of the way. It is obvious that the drill carriage in being elevated, picks up, and carries with it, the guide bar 31.

Securing bolts 108, are then threaded through the perforations, made in the volume as just described, the insertion being made from beneath the volume. When the securing bolt is threaded through its respective perforation, the member 61, underlying the perforation, is raised to the position shown in Fig. 18, engaging the head of the bolt 108 and thereby holding it in position, the end of the said bolt projecting through the perforation and above the upper surface of the guide plate 42. When all the perforations have been provided with their securing bolts, and the members 61 have been elevated to retain the bolts therein, as clearly shown in Fig. 18, the evener board 67 is then again lowered to its normal position, shown in Fig. 1, the covers 104 and 106, resting upon the upper surfaces of the members 61 and the evener board 67, their inner ends being still clamped between the plates, as hereinbefore described. The members 61 are of sufficient length to extend from their pivotal mountings to the inner edge of the evener board 61, and, as hereinbefore described, the upper surfaces of the table 51, the upright members 61, and the evener board 67 in its normal position, are all in the same horizontal plane.

The guide plate 42 is then elevated, to the position shown in Figs. 1 and 2, thereby releasing the pressure which holds the upper flange 92 and the cover 104 between the plates 42 and 40. The cams 59 are then lowered, releasing the pressure which clamps the lower flange 92 and the lower cover 106 between the plates 54 and 56. The hand wheel 39 is then slightly rotated, reversely, for thereby releasing the pressure of the pressure bar on the papers to be bound. The ends of the covers 104 and 106 are then grasped and the whole volume pulled forwardly, onto the upper surface of the evener board 67, the said evener board now operating as a work table. Clamping disks or washers 109, shown in Fig. 20, are then placed upon the ends of the bolts 108, and by means of a wrench 110 are forced downwardly thereon, firmly clamping the bolt in the volume. The ends of the bolts 108 are then turned and flattened against the upper surface of the cover 104, as shown in Fig. 22. The covers 104 and 106 are then folded over the papers thus bound, forming covers for the volume, and my volume is completed, and in appearance is as shown in Fig. 23.

I claim—

1. A binding machine comprising the combination of means to receive the leaves to be bound, means to even the leaves on said receiving means, means to compress the leaves on the receiving means and adjacent the evening means, and means operable between the compressing and evening means to perforate the leaves while being compressed by said third means.

2. A binding machine comprising the combination of means to measure the thickness of the leaves forming the volume, means to measure the material for the back, means to even the leaves and adapted to be disposed to form a table support for subsequent operations on the leaves, means to compress the leaves, and means to perforate the leaves while under compression.

3. A binding machine comprising the combination of means to even the leaves for receiving a back and covers, means associated with the first means to compress the leaves evened thereby, and means to perforate the leaves, covers and back for binding, said first means operable to hold the covers in an upright position while the perforating means are operating.

4. A binding machine comprising the combination of means to even the leaves to be bound, means coöperating therewith to compress the leaves, means operable to perforate the compressed leaves between the evening and compressing means, and means carried by the compressing means for guiding the perforating means while operating.

5. A binding machine comprising the combination of spaced standards, means supported by the standards to receive and hold the leaves to be bound, means guided by the standards to compress the leaves while supported by the receiving means, means for perforating the leaves while under compression, an evener board movably and adjustably supported for movement to a vertical position between the standards and also to an inclined position from a horizontal position for respectively evening the leaves and supporting a cover to be applied to the leaves, and means for holding the evener board in any of its positions.

6. A binding machine comprising a combination of means to support the leaves to be bound, other means coöperating with the first means to even the leaves, means operable in conjunction with the aforesaid means to perforate the leaves, and an adjustably mounted pressure bar for compressing the leaves for the application of a back.

7. A binding machine comprising a combination of means to receive the leaves to be bound, means coöperating therewith to even the leaves, additional means operable to compress the evened leaves, means operable during the operation of the compressing means for perforating the leaves, and means to firmly hold a back and side covers on the leaves-compressing means for the perforating operation.

8. A binding machine comprising means to hold a plurality of leaves under pressure, and other means for holding a back and covers against said first means and in a position to be bound to the leaves, and means to perforate the leaves, backs and covers held by the aforesaid means.

9. A binding machine comprising means to hold a plurality of leaves under pressure, other means for holding a back and covers against said first means and in a position to be bound to the leaves, both of said means having registering openings, and means for perforating the leaves, back and covers through the openings of said first and second means.

10. A binding machine comprising means to hold a plurality of leaves under pressure, other means for holding a back and covers against said first means and in a position to be bound to the leaves, both of said means having registering openings, means for perforating the leaves, back and covers through the openings of said first and second means, and means movable beneath the perforated leaves, back and covers held by said first and second means for temporarily retaining fastening members inserted upwardly through the perforations formed.

11. A binding machine comprising a table for supporting a stack of leaves, perforated pressure members clamping the leaves therebetween, a second perforated pressure member coöperating with each first pressure member for clamping a cover thereto, the perforations of said members being alined, and means passing through the alined perforations of the pressure members to perforate the covers and leaves held thereby to receive securing means.

12. A binding machine comprising a table, and a normally horizontal evener board pivoted for swinging to a vertical position to even a stack of leaves on the table.

13. A binding machine comprising a table, a normally horizontal evener board pivoted for swinging to a vertical position to even a stack of leaves on the table, and means for horizontally adjusting the board in its vertical position toward and away from the table.

14. A binding machine, comprising a table, a normally horizontal evener board pivoted for swinging to a vertical position to even a stack of leaves on the table, means for horizontally adjusting the board in its vertical position and away from the table, and means for supporting the evener board at an inclination for the purpose set forth.

15. A book-binding machine including leaf-supporting means, means for compressing the leaves held thereby and consisting of opposing plates formed with registering bit-guiding openings, means for clamping the back and covers of the volume to said plates, said last means comprising a vertically guided plate and means for vertically moving the latter plate.

16. A book-binding machine including leaf-supporting means, means for compressing the leaves held thereby and consisting of opposing plates formed with registering bit-guiding openings, means for clamping the back and covers of the volume to said plates, said last means comprising a vertically guided plate and means for vertically moving the plate, an evener board mounted for swinging movement from a horizontal position to an upright position, said board carrying a fixed leg to support it in horizontal position, and means for engaging the leg to hold the board at an inclination.

17. A book-binding machine including leaf-supporting means, means for compressing the leaves held thereby and consisting of opposing plates formed with registering bit-guiding openings, means for clamping the back and covers of the volume to said plates, said last means comprising a vertically guided plate, means for vertically moving the plate, an evener board mounted for swinging movement from a horizontal position to an upright position, said board carrying a fixed leg to support it in horizontal position, means for engaging the leg to hold the board at an inclination, drilling bits for perforating the covers and leaves to receive inverted binding bolts, and bolt holding means hingedly mounted to swing upwardly beneath inverted binding bolts in engagement therewith to hold them in position during the securement of said bolts.

CHARLES F. McBEE.

Witnesses:
H. R. RAMSEY,
D. R. ZINNER.